United States Patent [19]
Lurin et al.

[11] Patent Number: 5,425,878
[45] Date of Patent: Jun. 20, 1995

[54] MEMBRANES FOR ION TRANSPORT AND METHOD FOR OBTAINING THEM

[75] Inventors: Christian Lurin, Saint-Remy; Christian Guizard, Gignac; Danielle Wettling, Chatenoy Le Royal; Pascale Lacan, Montpellier, all of France

[73] Assignee: Eastman Kodak Company, Rochester, N.Y.

[21] Appl. No.: 157,854

[22] Filed: Nov. 24, 1993

[30] Foreign Application Priority Data

Dec. 10, 1992 [FR] France ............................ 92 15126

[51] Int. Cl.$^6$ ............................................ B01D 61/00
[52] U.S. Cl. ................................ 210/653; 210/651; 210/490; 210/500.27; 210/500.28; 210/500.37; 210/500.28; 210/638; 96/6; 264/45.1; 264/48; 427/337; 521/27
[58] Field of Search ................ 210/500.27, 490, 651, 210/500.28, 653, 506, 500.37, 500.38, 638; 521/27; 428/411.1; 96/6; 427/337, 372.2; 264/45.1, 48

[56] References Cited

U.S. PATENT DOCUMENTS

| | | | |
|---|---|---|---|
| 4,452,702 | 6/1984 | Blasius et al. | 210/638 |
| 4,460,474 | 7/1984 | Blasius et al. | 210/679 |
| 4,906,376 | 3/1990 | Fyles | 210/500.28 |
| 4,908,135 | 3/1990 | Brisdom et al. | 210/654 |
| 5,265,734 | 11/1993 | Linder et al. | 210/500.27 |

FOREIGN PATENT DOCUMENTS

0221508A1  5/1987  European Pat. Off. .

OTHER PUBLICATIONS

M. Abadie, B. Sillion (Eds.), "Polyimides and Other High–Temperature Polymers", 1991, Elsevier Science Publishers B.V., Amsterdam; C. Guizard et al: 'Heteropolysiloxanes Derived Membranes, Potentially for Liquid and Gas Separation', pp. 537–544.

*Primary Examiner*—Robert A. Dawson
*Assistant Examiner*—Ana M. Fortuna
*Attorney, Agent, or Firm*—J. Jeffrey Hawley

[57] ABSTRACT

The invention relates to membranes for facilitated ion transport in aqueous solutions. The membrane is an adduct of a heteropolysiloxane and a crown-ether, and contains certain ions such as picrate or fluoroborate. This membrane is efficient for the selective transport of potassium ions.

10 Claims, No Drawings

MEMBRANES FOR ION TRANSPORT AND METHOD FOR OBTAINING THEM

The present invention relates to the use of membranes for facilitated ion transport, extraction, separation and purification procedures.

Membranes, especially membranes and use thereof for dialysis or other separation processes, have been widely investigated.

A liquid membrane for facilitated ion transport comprises generally a liquid medium or a liquid phase with reactive groups; the reactive groups react with a specific solute to form a complex which is selectively transported across the membrane. After it has diffused across the membrane as the complex, the solute is released at the other side of the membrane. For instance, a complexing agent designated as the carrier, reacts selectively and reversibly with the solute to be transported. Such separations have been performed with liquid membranes which allow fast diffusion rates. Liquid membranes have been described in the art, e.g. in U.S. Pat. No. 4,452,702 (Blasius et al) relating to a liquid membrane using adducts of heteropolyacids and crown-ethers as carriers to extract cesium ions from aqueous solutions. In liquid membranes, the carrier is dissolved in an organic phase which constitutes the membrane. However, liquid membranes are not commonly used commercially because of their poor stability in the prolonged presence of aqueous solutions.

Other types of membranes have been disclosed in the art, e.g. in U.S. Pat. No. 4,460,474 (Blasius et al), which describes a membrane using solid state adducts of heteropolyacids and crown-ethers as reactive groups incorporated in a porous medium, to extract cesium ions from aqueous solutions. In this case, the membrane still consists in a liquid organic phase with a carrier incorporated therein.

Given the increasing need of performing more efficient separations or extractions especially of metal ions from aqueous solutions, it has appeared desirable to provide more stable selective membranes. It has been therefore proposed to use solid state components, or solid state membranes instead of liquid membranes. A polymeric membrane containing grafted crown-ethers described in U.S. Pat. No. 4,906,376 is reported to be useful for proton-driven ion transport.

The object of the present invention is to provide solid state membranes with reactive groups permanently bonded to a matrix, which allow an improved facilitated transport of metal ions from aqueous solution.

A further object of the present invention is to provide a process to extract metal ions from an aqueous solution containing such ions in the presence of other metal ions, said process having the advantages of good selectivity, and improved transport rates as compared to processes using prior art membranes. The rate can be from 100 to 1000 times the rate obtained with the liquid membranes of the prior art.

This object is achieved with a solid state element characterized in that:

(a) it comprises a microfiltration membrane having coated thereon an active layer which consists in a heteropolysiloxane having bound thereto a carrier residue and (b) the active layer contains an active anionic specie which is voluminous and has a delocalized charge.

By "delocalized charge", it is meant that the charge of the anion is statistically shared between two or more locations or atoms of the anion, due to e.g. mesomeric effects. Useful active anionic species according to this present invention are large polyatomic anions, having a delocalized charge and preferably a lipophilic character. Examples of such anions are anions of formula $MX^-_4$ wherein M is an atom of group IIIb and X is halogen, phenyl or subtituted phenyl, hexafluorophosphate, arylsulfonate and substituted arylsulfonate, nitrophenolate and substituted nitrophenolate, ions of strong carboxylic acids.

In the present specification, the terms "facilitated transport" designate the transport of ions through a membrane which contains a carrier.

A facilitation factor F is defined as $$F = \frac{D_1}{D_o}$$

where $D_o$ is the diffusion rate of the solute of the source phase through a membrane containing no carrier, and $D_1$ is the same diffusion rate through the same membrane, except it contains a carrier. When $F > 1$, the transport is facilitated.

The selectivity of the membrane for species x with respect to species y, is defined as $$S = \frac{D_{1x}}{D_{1y}}$$

where $D_{1x}$ and $D_{1y}$ are the diffusion rates for species x and y respectively.

The solid state element of the present invention is a composite element comprising a supporting microfiltration membrane and an active layer.

According to the present invention, it has been found that heteropolysiloxane (HPS) materials, having grafted thereon carrier residues were particularly suitable for extracting metal ions from aqueous solutions, when the extraction is performed in the presence of certain ionic species. One of the characterizing feature of the invention is thus the selection of a specific matrix, namely the grafted HPS material. The HPS material can be obtained by sol-gel methods from organically modified silicon alkoxides, which offers a high flexibility for adjusting the balance of inorganic and organic components and thus the hydrophobic/hydrophilic, and mechanical properties of the material.

The preparation of HPS materials has been described in the art, e.g. in "Organically modified silicates in organic-inorganic Polymers", H. K. Schmidt, A. C. S. Symposium Series 1988, chapt 27, No 360, pages 333–344, or in "Heteropolysiloxane derived membranes; Potentiality for liquid and gas separation", C. Guizard et al., Polyimides and other high temperature polymers, Ed M. Abadie, B. Sillion, pages 537–544, Elsevier Science Publishers B.V. Amsterdam, 1991. Illustrative of useful aminosilanes are 3-aminopropyltriethoxysilane, 3-aminopropyltrimethoxysilane, 3-aminopropylmethyldiethoxysilane. Such compounds are commercially available. A known way to obtain the HPS precursor is to react an aminosilane (1), with an acid chloride (2) to an amide linkage. The resulting HPS precursor (3) can be then submitted to controlled hydrolysis to give the HPS sol-gel material.

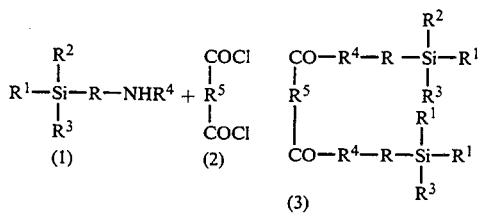

where R, R¹, R², R³, R⁴, R⁵ are defined below.

Chlorides of various diacids can be used for this purpose provided that they offer the appropriate steric and reactivity conditions, such as chlorides of aromatic dicarboxylic acids, e.g. chloride of terephthalic acid.

Other difunctional compounds having the capacity to react with the amino group of the aminosilane, can be used.

The suitable aminosilanes have the following generic formula:

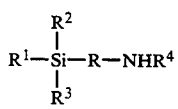

wherein:
- $R^1$, $R^2$, $R^3$ represent each independantly an alkyl group of 1–10 carbon atoms, an alkoxy group of 1 to 10 carbon atoms, a cycloalkyl group of 3–10 carbons atoms, an aryl group of 6–10 carbon atoms, an aryloxy groups of 6–10 carbon atoms, an aralkyl group, an alkaryl group; with the additional proviso that at least two of R1, R2, R3 are hydrolysable groups, e.g. alkoxy.
- R represents an alkylene group of preferably of 2–10 carbon atoms, an arylene group, an alkylene-oxy-alkylene group;
- $R^4$ represents a hydrogen atom or a lower alkyl group.

Another feature of the present invention is that a carrier is grafted on the HPS material. According to an embodiment, the carrier is a crown-ether Crown-ethers, or macrocyclic polyethers, are known in the art and have been disclosed for instance in "Crown Compounds their characteristics and applications", Michio Hiraoka, Elsevier 1982 ISBN 0-444-99692-3, "The Chemistry of ethers, crown ethers, hydroxyl groups and their ... analogues", Saul PATAI, Interscience Publication, 1980, ISBN O-471-27771-1.

In the present description the term "crown-ether" can designate not only cyclic polyethers, but also compounds such as cyclic compounds comprising oxygen, nitrogen and/or sulfur atoms in the cycle, or ether compounds which, while they are not cyclic, have a molecule that can have the shape of a quasi-cycle.

The person skilled in the art will recognize that, depending on metal ion to be extracted with the membrane, a carrier specific to this metal will be used. In a particular embodiment, said compounds can be represented by the following formula:

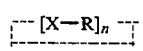

wherein

X is an oxygen or sulfur heteroatom, or a $NR^5$ radical wherein $R^5$ is H, alkyl or aryl;

n is an integer from 3 to 10 and preferably from 4 to 6;

R is lower alkylene or subtituted lower alkylene with preferably 2 or 3 carbon atoms in the alkylene chain, with the proviso that at least one alkylene is substituted with a function capable of reaction with an aminosilane to produce the grafted HPS precursor.

According to an embodiment, the function on the ethylene group of the crown-ether capable of reaction with an aminosilane, is acid chloride (—COCl), chloromethyl ($CH_2Cl$), aldehyde (—CHO), acid, ester.

According to a preferred embodiment, R is an ethylene group and the crown-ether has the formula:

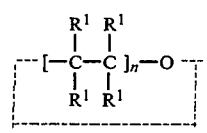

wherein $R^1$ represents hydrogen, alkyl, or two R1 can be combined to represent a cycloalkylene-1,2 group, or an arylene-1,2 group, with the proviso that at least one of such groups is substituted with a function capable of reaction with an aminosilane to produce a grafted HPS precursor, and n is an integer from 3 to 10 and preferably from 4 to 6.

Examples of such crown-ethers, referred-to as functionalized crown-ethers, are:

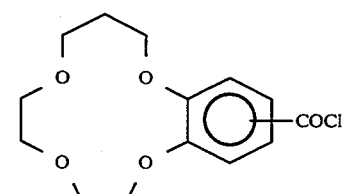

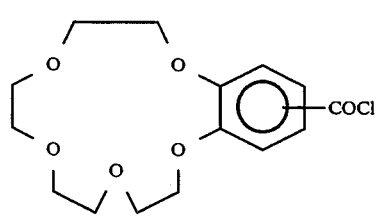

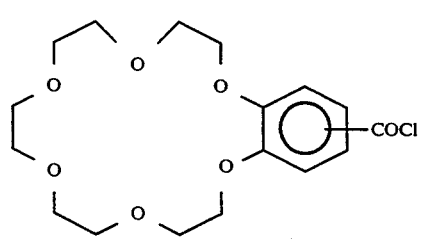

-continued

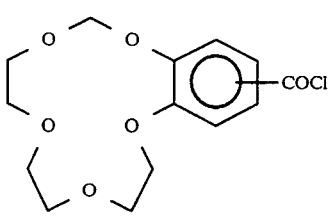

The functionalized crown-ether is grafted on an aminosilane; the grafted crown-ether is then mixed with the heteropolysiloxane precusor in a solvent, hydrolyzed to produce a sol-gel and coated on a support. After drying and heating at moderate temperature, a thin membrane coated on the support is obtained.

According to an alternative, the functionalized crown-ether and the acid chloride are mixed and this mixture is allowed to react in a single step with the aminosilane, leading to an homogeneous blend of crown-ether grafted on the aminosilane and heteropolysiloxane precursors. After elimination of the by-products and solvents the components of the blend are dissolved in a solvent, hydrolyzed to produce a sol-gel coated and processed as indicated above. The molar ratio of grafted crown-ether to HPS is in the range of 5 to 40 mol % and preferably in the range of 10 to 30 mol %, based on Si.

The membranes are used as sheets mounted in a cell so as to delimit two chambers in this cell. The membranes can be self supported; however, it is also possible to blend the active HPS of the membrane with an inert substance. Also, because it is often preferred to use very thin membranes the membrane can be supported by a plastic base sheet or support having the required characteristics regarding porosity, adhesiveness, non-reactivity, hydrophobicity, etc. Polymeric materials such as acrylic polymers, e.g. polyacrylonitrile can be used.

The heating step is carried out at a moderate temperature typically below 150° C., preferably between 60° and 100° C., a range of 70°–90° C. being most preferred. Although the mechanism is not entirely understood, it is believed that the heating step allows to achieve the network polycondensation in the presence of the atmospheric moisture. After the drying and heating step, the thickness of the membrane is from about 0.5 to 20 μm and preferably between 1 and 10 μm.

Various conventional coating techniques can be used to coat or cast the membrane on the support, e.g. spin coating, dip coating from appropriate coating or casting solutions.

It has been mentioned that one essential aspect of the present invention is the use of a carrier to achieve the facilitated transport of metal ions through the membrane. The carrier such as the crown ethers and related compounds mentioned above, has to be present in the membrane during the ion transport. In order to operate the transport in the presence of the anionic species, the membrane can be conditioned with the anionic species by contact with a source phase containing the anionic species, or preconditioned in a separate step by contact with a solution of the anionic species.

The following examples illustrate the preparation and the use of membranes according to the invention.

EXAMPLE 1

Synthesis of HPS Precursor 2.15 ml (10 mmole) of aminopropylmethyldiethoxysilane were mixed with 30 ml of anhydrous ether; then, 1 ml of (12 mmole) distilled pyridine was added as a trapping agent for HCl. 1 g (5 mmole) of terephthalic acid chloride was added under argon atmosphere to the mixture, which was allowed to react for 15 hours at room temperature. The reaction mixture was then centrifugated; the liquid was separated from the white precipitate (pyridinium chloride) and the solvents were eliminated under vaccum (25° C., pressure <2 mm Hg). The HPS precursor was stored under argon and then used without further purification. Yield: 90%. All spectroscopic and analytical data are consistent with the proposed formula:

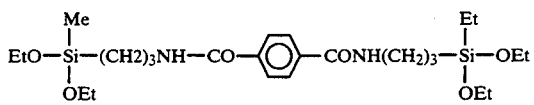

EXAMPLE 2

4'-formylbenzo-15-crown-5-ether (A)

A solution of hexamethylenetretramine (1.87 mmol, 0.27 g) in trifluoroacetic acid (1.4 cm3) was added to benzo 15-crown-5 ether (1.87 mmol, 0.5 g) under nitrogen; the mixture was heated to reflux for 12 hours.

The cool mixture was evaporated under reduced pressure and the residue was then treated with water (25 cm$^3$) with stirring for 1 hour.

The residue was then extracted with toluene (3×25 cm$^3$).

The combined organic phases were dried with magnesium sulfate and evaporated under reduced pressure to leave essentially pure product as a pale yellow oil which solidified on standing.

The aldehyde was recrystallised from n-heptane as a white solid.

| Yield = 55% | MP = 78–87° C. |
| --- | --- |

All spectroscopic and analytical data were consistent with the proposed structure.

Preparation of 4'-carboxybenzo-15-crown-5: (B)

4'-hydromethylbenzo-15-crown-5 (3.36 mmol, 1 g) was added to a solution of potassium carbonate (0.1 g) in water (5 ml) maintained at 0° C.

A solution of potassium permanganate (11.4 mmol, 1.8 g) in water (30 ml) was added slowly, with stirring for 2 h.

The stirred reaction mixture was allowed to come to room temperature and then filtered. The liquid was separated from the brown precipitate (manganese dioxide) and pH was adjusted to pH 1 by addition of concentrated sulphuric acid.

Cooling the solution to 0° C. afforded a precipitate which was collected, dried and then recrystallised from water to give the acid.

| Yield 84% | MP: 186° C. |
| --- | --- |

All spectroscopic and analytical data were consistent with the proposed structure.

Preparation of 4'-chlorocarbonylbenzo-15-crown-5: (C)

4-carbonylbenzo-15-crown (5.28 mmol, 0.88 g) was stirred with a solution of oxalyl chloride (1 cm$^3$) in dichloromethane (15 cm$^3$) containing dry pyridine (1 drop) for 4 h at room temperature.

During this time, complete dissolution of the solid occured. The solvent was removed by evaporation under reduced pressure (22°, <2 mm Hg).

Further portions of dichloromethane (2×10 cm$^3$) were added to the residue and removed in the same way to yield a solid (white) which was used without further purification.

Preparation of
4'-(N-n-propyltrimethoxysilyl)carboxamidobenzo-15-crown-5: (D)

The aminopropyltrimethoxysilane (2.8 mmol, 0.5 g) was dissolved in THF (4 cm$^3$) under N$_2$ and cooled to 0° C.

Triethylamine (2.8 mmol, 0.28 g) was added in one portion and then a solution of acetylchloride crown-ether (C) (2.8 mmol, 0.9 g) in THF (2 cm$^3$) was added dropwise over 10 minutes.

The reaction was allowed to warm up to 22° C. and was stirred for 16 h (overnight).

The precipitated triethylamine hydrochloride was removed by filtration and was washed with ether (2×5 cm$^3$).

The combined organic phases were evaporated to leave a semi solid product which was recrystallized from isopropyl ether Yield 94%.

All spectroscopic and analytical data were consistent with the proposed structure of the crown-ether grafted on the aminosilane.

EXAMPLE 3

Preparation of the HPS Membrane 2,2 ml (10,5 mmole) of aminopropylmethyldiethoxysilane were mixed with 30 ml of anhydrous ether; then, 1 ml (12 mmole) of distilled pyridine was added as HCl trapping agent.

0,7 g (3,5 mmole) of terephthalic chloride was added under argon atmosphere to the mixture, then 1,15 g (3,5 mmole) of 4'-chlorocarbonylbenzo-15-crown-5 (C). The mixture was allowed to react for 15 hours. The reaction mixture was then centrifugated; the liquid was separated from the white precipitate (pyridium chloride) and the solvent were eliminated under vacuum (25°, <2 mm Hg). A mixture of HPS precursor and grafted crown ether HPS precursor was prepared in the ratio $$\frac{\text{grafted crown ether}}{\text{HPS}} = \frac{1}{3}$$

based on Si. 5 ml of methanol were added to obtain an homogeneous solution having a concentration in solids of about 400 g/l.

The solution was then coated on a 0.030 mm thick polyacrylonitrile microfiltration membrane, using a cylindrical glass rod. The resulting layer was then dried at room temperature and finally heated at 80° C. for 1 hour. In this step, it was assumed that the polycondensation network of the siloxane was completed in the presence of atmospheric water. The dry membrane thickness was about 5 μm.

EXAMPLE 4

Use of the Membrane for Ion Transport

The membrane obtained in example 3 was fixed in a cell between two chambers. The volume of each chamber is 80 cm$^3$ and the surface of the membrane is about 16 cm$^2$. The source phases were comprised of aqueous solutions of K$^+$ and, Li$^+$ ions, Cl$^-$ being the counterion. The salt concentrations in the source phase were in all cases 0.1 mole/l and the receiving phase was water (80 ml). Cations present in the source phase were K$^+$, Li$^+$.

The ion flow rates were continuously measured by conductivity and concentrations by ICP measurements. Transport rates of the cations of the source phase were measured with the following different membranes:

a) a HPS membrane containing no crown-ether and no picrate;

b) a HPS membrane containing picrate, but no crown-ether;

c) a HPS membrane containing 30 mole percent of a grafted crown-ether and no picrate;

d) a HPS membrane containing 30 mole percent of the grafted crown-ether and picrate (invention).

The results are reported on Table I; they show the K+ selectivity of the membrane according to the invention; the yellow-colored membrane containing the crown-ether and the picrate ions proved to have a higher flow rate for K$^+$.

TABLE I

| Crown-ether (1) | Picrate | K$^+$ flux (mole/24 h cm$^2$) | Selectivity(s) K$^+$/Li$^+$ |
|---|---|---|---|
| a) none | no | 1.5 × 10$^{-7}$ | 1 |
| b) none | yes | 2.0 × 10$^{-7}$ | 1 |
| c) 30 mole % | no | 1.8 × 10$^{-7}$ | 3 |
| d) 30 mole % | yes | 1.5 × 10$^{-4}$ | 3–6 |

(1) benzo-15-crown-5 (grafted on HPS)

EXAMPLE 5

The procedure of example 4 was repeated, except that conditioning of the membrane was made with a solution containing 0.1M of KOH and 7.10$^{-5}$M of potassium fluoroborate.

The source phase was comprised of KCl 0.1M and LiCl 0.1M. Facilitated and selective transport of K$^+$ was observed (F=500; S=6).

EXAMPLE 6

The procedure of example 4 was repeated, except that conditioning of the membrane was made with a solution containing 0.1M KOH, and 7.10$^{-5}$M of potassium phenylsulfonate.

The source phase was comprised of 0.1M KCl and 0.1M LiCl. Selective and facilitated transport of K$^+$ was observed (F=420; s=3.5).

EXAMPLE 7

The procedure of example 4 was repeated, except that conditioning of the membrane was effected with a solution containing 0.1M KOH and 7.10$^{-5}$M of potassium hexafluorophosphate. The source was comprised of 0.1M KCl and 0.1 M LiCl. Facilitated and selective transport of K$^+$ was observed (F=100; s=3).

EXAMPLE 8

The procedure of example 4 was repeated, except that conditioning of the membrane was effected with 0.1M of KOH and $7.10^{-5}$M of potassium trifluoroacetate. The source was comprised of 0.1M KCl and 0.1M LiCl. Facilitated and selective transport of K+ was observed (F=340; s=3).

EXAMPLE 9 (COMPARATIVE)

For comparative purposes, a liquid membrane for potassium extraction is prepared as described in U.S. Pat. No. 4,452,702, with same active components as in the present invention. This liquid membrane was made by filling the bottom part of a 50 cm high U-tube having a diameter of 3 cm with 300 ml of methylene chloride containing $7 \times 10^{-5}$M of benzo-15-crown-5 as the carrier.

The source phase in one branch of the U-tube was 150 ml of 0.1M potassium chloride, 0.1M lithium chloride and $2.10^{-4}$M of picric acid.

The receiving phase in the other branch of the U-tube was 150 ml water.

The liquid membrane was selective for potassium, with a flux of $3.10^{-7}$ mole/24 h cm$^2$.

The invention has been described with reference to particular preferred embodiments thereof but it will be understood that variations and modifications can be effected within the spirit and scope of the invention.

What is claimed is:

1. A Solid state element for facilitated ion transport, comprising a microfiltration membrane having coated thereon an active layer which consists of a heteropolysiloxane having a carrier radical grafted thereon and (b) the active layer contains an active ionic specie which is a voluminous polyatomic anion having a delocalized charge.

2. The element of claim 1, wherein the active ionic specie is lipophilic.

3. The element of claim 2, wherein the active ionic specie is trifluoroacetate.

4. The element of claim 2, wherein the active ionic specie is picrate.

5. The element of claim 1 wherein the active ionic specie is fluoroborate.

6. The element of claim 1, wherein the carrier radical is a crown-ether radical.

7. A method for the extraction of cations from aqueous solution, wherein an aqueous solution containing said cations is contacted with a solid state element which consists in a microfiltration membrane having an active layer which comprises a heteropolysiloxane having grafted thereon crown-ether radicals, wherein the active layer contains an active ionic specie which is a voluminous polyatomic anion, and has a delocalized charge.

8. The method of claim 7, wherein said cations to be transported are potassium cations.

9. The method of claim 7, wherein the ionic specie is fluoroborate.

10. A method to prepare a solid state element for facilitated ion transport, comprising the steps of:
    (a) grafting a functionalized crown-ether on a heteropolysiloxane precursor;
    (b) mixing the product obtained in step (a) with a heteropolysiloxane precursor in a common solvent,
    (c) coating the solution obtained in step (b) on a microfiltration membrane, and
    (d) drying the element obtained in step (c) at a temperature comprised between 60° C. and 150° C.; the element being either conditioned with an active ionic specie which is a voluminous polyatomic anion having a delocalized charge by contact with a source phase containing said active ionic specie or preconditioned in a separate step by contact with a solution of said active ionic specie.

* * * * *